United States Patent Office 3,347,333
Patented Oct. 17, 1967

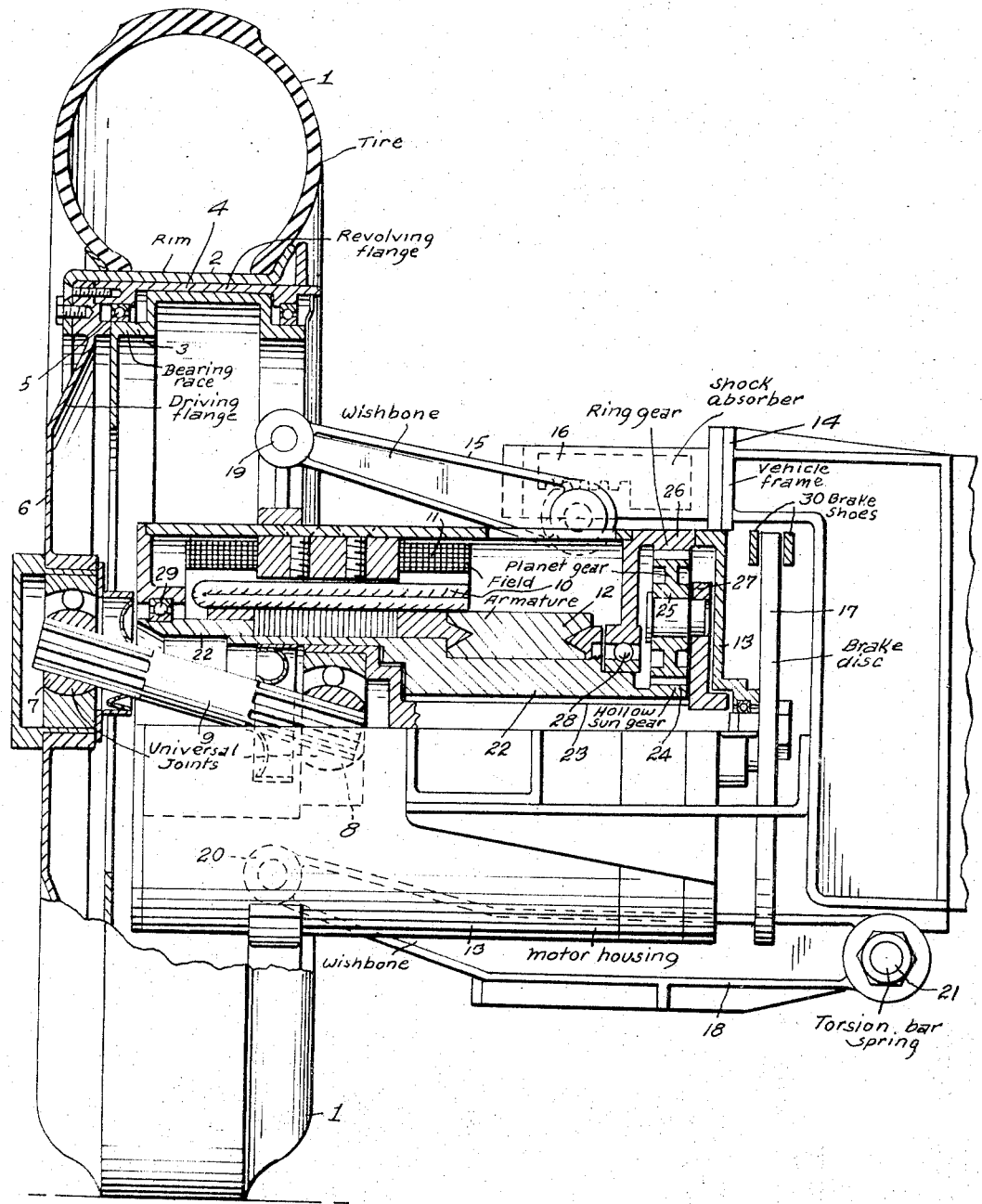

3,347,333
POWERED VEHICLE WHEEL
Theodoric B. Edwards, deceased, late of Lorton, Va., by Helen M. Edwards, executrix, 467 Buckner Road, Manassas, Va. 22110
Filed July 12, 1965, Ser. No. 471,797
4 Claims. (Cl. 180—65)

ABSTRACT OF THE DISCLOSURE

An electric wheel 1 of a vehicle is powered by motor 10–13 through gear train 22–26 and stub drive shaft 9. The motor and gearing are carried by the vehicle frame and therefore do not bounce and directly receive ground vibrations.

---

The invention decsribed herein may be manufactured and used by or for the Government for governmental purposes, without the payment to me of any royalty thereon.

Many advantages have been shown for vehicle drive apparatus where a separate motor is used to power each wheel. For simplicity of design the motor is usually mounted on the wheel assembly and is unsprung, thereby rendering it subject to unnecessary shock, vibration and other shortcomings.

The present invention provides apparatus for mounting the motor on the vehicle frame with flexible power transmitting apparatus to deliver the power to the wheel assembly, which moves relative to the frame. The special mounting, transmission apparatus, and means connecting the fixed vehicle frame to the vertically movable vehicle wheel, make possible an improved construction.

The single figure is a cross-section through the invention illustrating an exemplary embodiment.

Tire 1 is mounted on a rim 2 to rotate on bearings 5 about nonrotatable bearing race 3. Revolving flange 4 and rim 2 are driven by driving flange 6 which is driven by universal joint 7. A drive shaft 9 is connected to universal joints 7 and 8 by a splined connection at one or each end of the shaft.

Motor armature 10, 12 is rotatable in field 11 and field 11 is fixedly mounted in motor housing 13, which is rigidly attached to vehicle frame member 14. Unequal length wishbones 15 and 18 pivotally connect the wheel assembly to the frame at shock absorber 16, pivot 19, and at pivot 20, torsion bar spring-pivot 21 respectively. The torsion bar spring is anchored at one end to wishbone 18 and at its opposite end to frame 14 to provide a spring action in a manner well-known in the art.

The motor armature 10, 12 is supported on hollow quill 22 and quill 22 is supported by bearings 28, 29. Sun gear 24, on quill 22, drives planet gear 25, yoke 27 and shaft 23. Nonrotating ring gear 26 engages the teeth of planet gear 25 as is well-known in the art. Shaft 23 drives shaft 9 through universal joint 8 and shaft 9 drives the wheel assembly through universal joint 7.

A brake disc 17 may be mounted for rotation with shaft 23 and may be braked by brake shoes 30 in a manner well-understood in the art.

I claim:
1. Individual wheel power apparatus for a vehicle comprising a frame member, a motor housing rigidly mounted on said frame member, a wheel assembly, means mounting said wheel assembly for pivotable movement relative to said frame member, a motor rigidly mounted in said rigidly mounted motor housing, drive means connecting said motor to said wheel assembly, said drive means comprising universal drive members providing a driving connection between said rigidly mounted motor and said pivotable wheel assembly irrespective of relative movement between said motor and said assembly, torsion spring means cushioning movement between said frame member and said wheel assembly, shock-absorbing means reducing shock transmission between said frame member and said wheel assembly, brake means connected to said motor, said rigidly mounted motor comprising an electric field coil rigidly mounted in said rigidly mounted motor housing, an armature rotatable relative to said field coil, and said drive means including gear reduction means.

2. Apparatus as in claim 1 wherein said gear reduction means comprises a hollow sun gear connected to said rotatable armature, a planet gear driven by said sun gear, a stationary ring gear outside of and engaging said planet gear, and a drive connection from said planet gear passing through said hollow sun gear to said universal drive members.

3. Apparatus as in claim 6 wherein said universal drive members comprise a drive shaft with a universal connection with said drive connection and a universal connection with said wheel assembly.

4. Apparatus as in claim 3 and a splined connection between said drive shaft and one of said universal connections.

References Cited

UNITED STATES PATENTS

| 882,878 | 3/1908 | Ford. | |
|---|---|---|---|
| 1,076,652 | 10/1913 | Hoffman | 180—48 |
| 1,840,407 | 1/1932 | Norman | 180—43 |

FOREIGN PATENTS 812,931   5/1959   Great Britain.

BENJAMIN HERSH, *Primary Examiner.*
MILTON L. SMITH, *Examiner.*

UNITED STATES PATENT OFFICE
CERTIFICATE OF CORRECTION

Patent No. 3,347,333                                           October 17, 1967

Theodoric B. Edwards, deceased, by Helen M. Edwards, executrix

It is hereby certified that error appears in the above numbered patent requiring correction and that the said Letters Patent should read as corrected below.

Column 2, line 36, for the claim reference numeral "6" read -- 2 --.

Signed and sealed this 12th day of November 1968.

(SEAL)
Attest:

Edward M. Fletcher, Jr.                                     EDWARD J. BRENNER

Attesting Officer                                                   Commissioner of Patents